(12) United States Patent
Yen et al.

(10) Patent No.: US 9,516,039 B1
(45) Date of Patent: Dec. 6, 2016

(54) BEHAVIORAL DETECTION OF SUSPICIOUS HOST ACTIVITIES IN AN ENTERPRISE

(71) Applicant: EMC Corporation, Hopkinton, MA (US)

(72) Inventors: Ting-Fang Yen, Cambridge, MA (US); Alina Oprea, Arlington, MA (US); Kaan Onarlioglu, Brookline, MA (US); Todd Leetham, Bedford, MA (US); William Robertson, Boston, MA (US); Ari Juels, Brookline, MA (US); Engin Kirda, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 361 days.

(21) Appl. No.: 14/139,047

(22) Filed: Dec. 23, 2013

Related U.S. Application Data

(60) Provisional application No. 61/902,999, filed on Nov. 12, 2013.

(51) Int. Cl.
*H04L 29/06* (2006.01)

(52) U.S. Cl.
CPC .................................... *H04L 63/14* (2013.01)

(58) Field of Classification Search
CPC ........................................................ H04L 63/14
USPC ............................................................ 726/23
See application file for complete search history.

(56) References Cited

U.S. PATENT DOCUMENTS

| | | |
|---|---|---|
| 6,189,005 B1 | 2/2001 | Chakrabarti |
| 7,068,998 B2 | 6/2006 | Zavidniak |
| 7,661,136 B1 * | 2/2010 | Spielman ............ H04L 12/2602 726/12 |
| 7,673,340 B1 | 3/2010 | Cohen |
| 8,082,349 B1 | 12/2011 | Bhargava |
| 8,495,726 B2 | 7/2013 | Agarwal et al. |
| 8,516,576 B2 * | 8/2013 | Figlin et al. .................... 726/22 |
| 8,719,452 B1 | 5/2014 | Ding |
| 8,856,869 B1 | 10/2014 | Brinskelle |

(Continued)

OTHER PUBLICATIONS

U.S. Appl. No. 13/731,654, filed Dec. 31, 2012, titled: Time Sanitization of Network Logs from a Geographically Distributed Computer System.

(Continued)

*Primary Examiner* — Jeffrey Pwu
*Assistant Examiner* — William Corum, Jr.
(74) *Attorney, Agent, or Firm* — Ryan, Mason & Lewis, LLP

(57) ABSTRACT

Methods, apparatus and articles of manufacture for behavioral detection of suspicious host activities in an enterprise are provided herein. A method includes processing log data derived from one or more data sources associated with an enterprise network over a given period of time, wherein the enterprise network comprises multiple host devices; extracting one or more features from said log data on a per host device basis, wherein said extracting comprises: determining a pattern of behavior associated with the multiple host devices based on said processing; and identifying said features representative of host device behavior based on the determined pattern of behavior; clustering the multiple host devices into one or more groups based on said one or more features; and identifying a behavioral anomaly associated with one of the multiple host devices by comparing said host device to the one or more groups across the multiple host devices.

20 Claims, 4 Drawing Sheets

(56) References Cited

U.S. PATENT DOCUMENTS

| | | | |
|---|---|---|---|
| 2002/0083067 | A1 | 6/2002 | Tamayo |
| 2003/0188189 | A1* | 10/2003 | Desai et al. .................. 713/201 |
| 2004/0064731 | A1 | 4/2004 | Nguyen |
| 2004/0260733 | A1 | 12/2004 | Adelstein |
| 2005/0102292 | A1 | 5/2005 | Tamayo |
| 2007/0028291 | A1* | 2/2007 | Brennan et al. .................. 726/1 |
| 2007/0073519 | A1 | 3/2007 | Long |
| 2007/0180225 | A1 | 8/2007 | Schmidt |
| 2007/0192859 | A1 | 8/2007 | Shahar |
| 2007/0261112 | A1 | 11/2007 | Todd et al. |
| 2008/0155651 | A1 | 6/2008 | Wasmund |
| 2009/0222907 | A1 | 9/2009 | Guichard |
| 2010/0020700 | A1* | 1/2010 | Kailash et al. .............. 370/242 |
| 2010/0095374 | A1 | 4/2010 | Gillum et al. |
| 2010/0169476 | A1* | 7/2010 | Chandrashekar ... H04L 63/1441 709/224 |
| 2010/0241974 | A1* | 9/2010 | Rubin ................... G06F 21/554 715/764 |
| 2010/0274691 | A1 | 10/2010 | Hammad |
| 2010/0332540 | A1 | 12/2010 | Moerchen |
| 2011/0093944 | A1* | 4/2011 | Spielman ....................... 726/12 |
| 2011/0185401 | A1 | 7/2011 | Bak et al. |
| 2012/0072983 | A1* | 3/2012 | McCusker et al. ............. 726/22 |
| 2012/0084282 | A1 | 4/2012 | Chiang |
| 2012/0109821 | A1 | 5/2012 | Barbour et al. |
| 2012/0151565 | A1* | 6/2012 | Fiterman ............. H04L 63/0281 726/7 |
| 2012/0246720 | A1 | 9/2012 | Xie et al. |
| 2012/0260306 | A1* | 10/2012 | Njemanze .............. G06Q 10/06 726/1 |
| 2012/0304288 | A1* | 11/2012 | Wright et al. .................. 726/22 |
| 2013/0124548 | A1* | 5/2013 | Chhaparia et al. ........... 707/758 |
| 2013/0124717 | A1 | 5/2013 | Stevens et al. |
| 2013/0247148 | A1* | 9/2013 | Nappier et al. ................... 726/3 |
| 2014/0245443 | A1* | 8/2014 | Chakraborty ................... 726/23 |

OTHER PUBLICATIONS

U.S. Appl. No. 13/731,643, filed Dec. 31, 2012, titled: Framework for Mapping Network Addresses to Hosts in an Enterprise Network.

U.S. Appl. No. 13/731,635, filed Dec. 31, 2012, titled: Anomaly Sensor Framework for Detecting Advanced Persistent Threat Attacks.

Abu et al., A Multifaceted Approach to Understanding the Botnet Phenomenon. In ACM SIGCOMM Conf. Internet Measurement, 2006, pp. 1-12.

Antonakakis et al., Building a Dynamic Reputation System for DNS. In USENIX Security, 2010, pp. 1-17.

Antonakakis et al., Detecting Malware Domains at the Upper DNS Hierarchy. In USENIX Security, 2011, pp. 1-16.

Antonakakis et al., From Throw-away Traffic to Bots: Detecting the Rise of DGA-based Malware. In USENIX Security, 2012, pp. 1-16.

Bilge et al., Disclosure: Detecting Botnet Command and Control Servers Through Large-scale NetFlow Analysis. In ACSAC, 2012, pp. 1-10.

Bilge et al., EXPOSURE: Finding Malicious Domains Using Passive DNS Analysis. In NDSS, 2011, pp. 1-17.

Binkley et al., An Algorithm for Anomaly-based Botnet Detection. In USENIX Wksp. Steps to Reducing Unwanted Traffic on the Internet, 2006, pp. 43-48.

Brauckhoff et al., Anomaly Extraction in Backbone Networks Using Association Rules. In ACM SIGCOMM Conf. Internet Measurement, 2009, pp. 1-7.

Chapple et al., Authentication Anomaly Detection: A Case Study on a Virtual Private Network. In ACM Wksp. Mining Network Data, 2007, pp. 1-6.

Choi et al., Botnet Detection by Monitoring Group Activities in DNS Traffic. In IEEE Intl. Conf. Computer and Information Technology, 2007, pp. 715-720.

Cooke et al., The Zombie Roundup: Understanding, Detecting, and Disrupting Botnets. In USENIX Wksp. Steps to Reducing Unwanted Traffic on the Internet, 2005, pp. 1-6.

Dewaele et al., Extracting Hidden Anomalies Using Sketch and non Gaussian Multi-resolution Statistical Detection Procedures. In ACM Wksp. Large Scale Attack Defense, 2007, pp. 1-8.

Francois et al., BotTrack: Tracking Botnets Using NetFlow and PageRank. In Intl. IFIP TC 6 Conf. Networking. Springer-Verlag, 2011, pp. 1-14.

Freiling et al., Botnet Tracking: Exploring a Root-cause Methodology to Prevent Distributed Denial-of-service Attacks. In European Conf. Research in Computer Security. Springer-Verlag, 2005, pp. 1-32.

Gu et al., BotMiner: Clustering Analysis of Network Traffic for Protocol- and Structure-independent Botnet Detection. In USENIX Security, 2008, pp. 139-154.

Gu et al., BotHunter: Detecting Malware Infection Through IDS-driven Dialog Correlation. In USENIX Security, 2007, pp. 1-16.

Gu et al., BotSniffer: Detecting Botnet Command and Control Channels in Network Traffic. In NDSS, 2008, pp. 1-18.

Holz et al., Measuring and Detecting Fast-Flux Service Networks. In NDSS, 2008, pp. 1-12.

John et al., Studying Spamming Botnets Using Botlab. In USENIX NSDI, 2009, pp. 1-15.

Jolliffe. Principal Component Analysis. Springer-Verlag, 1986, pp. 1-56.

Karasaridis et al., Wide-scale Botnet Detection and Characterization. In USENIX Wksp. Hot Topics in Understanding Botnets, 2007, pp. 1-8.

Levine et al., The Use of Honeynets to Detect Exploited Systems Across Large Enterprise Networks. In IEEE Wksp. Information Assurance, 2003, pp. 92-99.

Livadas et al., Using Machine Learning Techniques to Identify Botnet Traffic. In IEEE Conf. Local Computer Networks, 2006, pp. 1-6.

Ma et al., Beyond Blacklists: Learning to Detect Malicious Web Sites from Suspicious URLs. In ACM SIGKDD Intl. Conf. Knowledge Discovery and Data Mining, 2009, pp. 1-9.

Nazario et al., As the Net Churns: Fast-flux Botnet Observations. In Intl. Conf. on Malicious and Unwanted Software, 2008, pp. 1-9.

Passerini et al., FluXOR: Detecting and Monitoring Fast-Flux Service Networks. In Intl. Conf. Detection of Intrusions and Malware, and Vulnerability Assessment. Springer-Verlag, 2008, pp. 1-20.

Perdisci et al., Detecting Malicious Flux Service Networks through Passive Analysis of Recursive DNS Traces. In ACSAC, 2009, pp. 1-10.

Ramachandran et al., Understanding the Network-level Behavior of Spammers. In ACM Conf. on Applications, Technologies, Architectures, and Protocols for Computer Communications, 2006, pp. 1-12.

Sperotto et al., Anomaly Characterization in Flow-Based Traffic Time Series. In IEEE Intl. Wksp. IP Operations and Management. Springer-Verlag, 2008, pp. 1-13.

Stone-Gross et al., Your Botnet is My Botnet: Analysis of a Botnet Takeover. In ACM CCS, 2009, pp. 1-13.

Strayer et al., Detecting Botnets with Tight Command and Control. In IEEE Conf. Local Computer Networks, 2006, pp. 1-8.

Villamarin-Salomon et al., Bayesian Bot Detection Based on DNS Traffic Similarity. In ACM Symp. Applied Computing, 2009, pp. 2035-2041.

Wagner et al., Entropy Based Worm and Anomaly Detection in Fast IP Networks. In IEEE Intl. Wksp. Enabling Technologies: Infrastructure for Collaborative Enterprise, 2005, pp. 1-6.

Yadav et al., Detecting Algorithmically Generated Malicious Domain Names. In ACM SIGCOMM Conf. Internet Measurement, 2010, pp. 1-14.

Yadav et al., Winning With DNS Failures: Strategies for Faster Botnet Detection. In Intl. ICST Conf. Security and Privacy in Communication Networks, 2011, pp. 1-10.

Yen et al., Traffic Aggregation for Malware Detection. In Intl. Conf. Detection of Intrusions and Malware, and Vulnerability Assessment. Springer-Verlag, 2008, pp. 207-227.

(56) References Cited

OTHER PUBLICATIONS

Zhang et al., Safeguarding Academic Accounts and Resources with the University Credential Abuse Auditing System. In Intl. Conf. Dependable Systems and Networks. IEEE Computer Society, 2012, pp. 1-8.
Page et al., "The PageRank citation ranking: Bringing order to the web." 1998, pp. 1-17.
Rosvall et al., "Maps of random walks on complex networks reveal community structure," PNAS, vol. 105, No. 4, pp. 1118-1123, Jan. 29, 2008, pp. 1-62.
U.S. Appl. No. 14/139,003, filed Dec. 23, 2013, titled: Detecting Suspicious Web Traffic from an Enterprise Network.
U.S. Appl. No. 14/138,961, filed Dec. 23, 2013, titled: Identifying Suspicious User Logins in Enterprise Networks.
U.S. Appl. No. 14/139,019, filed Dec. 23, 2013, titled: Modeling User Working Time Using Authentication Events within an Enterprise Network.
U.S. Appl. No. 14/698,201, filed Apr. 28, 2015, titled: Defending Against a Cyber Attack via Asset Overlay Mapping.
Takemori et al. Detection of Bot Infected PCs Using Destination-Based IP and Domain Whitelists during a Non-operating Term, 2008, IEEE, pp. 1-6.

* cited by examiner

BEHAVIORAL DETECTION OF SUSPICIOUS HOST ACTIVITIES IN AN ENTERPRISE

CROSS-REFERENCE TO RELATED APPLICATION

The present application claims priority to U.S. Provisional Patent Application Ser. No. 61/902,999, filed Nov. 12, 2013, entitled "Large-Scale Log Analysis for Detecting Suspicious Activity in Enterprise Networks," incorporated by reference herein in its entirety.

FIELD

The field relates generally to information technology (IT), and more particularly to IT security within enterprises.

BACKGROUND

Protection of computing infrastructure in large organizations is a growing challenge. Both generic malware and targeted attacks (such as, for example, advanced persistent threats (APTs)) continue to grow in sophistication and outpace the capabilities of traditional defenses such as antivirus software. Additionally, administrators' visibility into the posture and behavior of hosts is eroding, as employees increasingly use personal devices for business applications. Further, traditional perimeters of organizations are breaking down, moreover, due to new complexities in intelligence and file sharing, contractor relationships, and geographical distribution.

Many organizations and enterprises attempt to address these challenges by deploying security products that enforce policies and generate situational intelligence in the form of security logs. Such products yield logs that contain high volumes of information about activities in the network. For example, authentication logs might suggest that an employee's account has been compromised because a login has occurred from a region that the targeted employee has never visited. As another example, web proxy logs might record which site a user visited before being compromised by a drive-by download attack.

While existing detection approaches include examining logs to conduct forensic analysis of suspicious activity in a network, such approaches remain largely manual processes and often rely on signatures of known threats. Additionally, existing security products often come from a patchwork of vendors and are inconsistently installed and administered. Consequently, such products generate logs with formats that differ widely and that are often incomplete, mutually contradictory, and large in volume. Accordingly, a need exists for techniques to automatically extract and leverage knowledge from log data produced by a wide variety of security products in a large enterprise.

SUMMARY

One or more illustrative embodiments of the present invention provide behavioral detection of suspicious host activities in an enterprise. In accordance with an aspect of the invention, a method is provided comprising the steps of: processing log data derived from one or more data sources associated with an enterprise network over a given period of time, wherein the enterprise network comprises multiple host devices; extracting one or more features from said log data on a per host device basis, wherein said extracting comprises: determining a pattern of behavior associated with the multiple host devices based on said processing; and identifying said one or more features representative of host device behavior based on the determined pattern of behavior; clustering the multiple host devices into one or more groups based on said one or more features; and identifying a behavioral anomaly associated with one of the multiple host devices by comparing said host device to the one or more groups across the multiple host devices of the enterprise network.

The techniques of the illustrative embodiments described herein overcome one or more of the problems associated with the conventional techniques described previously, and provide behavioral detection techniques. These and other features and advantages of the present invention will become more readily apparent from the accompanying drawings and the following detailed description.

DETAILED DESCRIPTION

As will be described herein, the present invention, in one or more illustrative embodiments, provides techniques for behavioral detection of suspicious host activities in enterprise networks that signal potential security incidents. In accordance with at least one embodiment of the invention, such incidents can be further analyzed by incident response teams to determine whether an attack and/or a policy violation has occurred. As detailed herein, because behaviors observed in enterprise settings can often be more constrained by policy and typical employee behavior than behaviors on the open Internet, an aspect of the invention includes identifying suspicious activities by analyzing behaviors in enterprise-specific ways.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
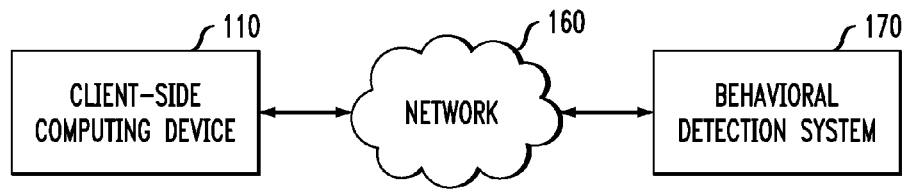
FIG. 1 is a diagram illustrating an example network environment in which one or more embodiments of the present invention can operate.

FIG. 1 illustrates an example client-side computing device (CSCD) 110 communicating with behavior detection system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the behavior detection system 170 with data. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "user." The term "user," as used in this context, should be understood to encompass, by way of example and without limitation, a user device, a person (or employee, for example) utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with a CSCD device 110, a person utilizing or otherwise associated with the device, or a combination of both the person and the device.

Figure 2:
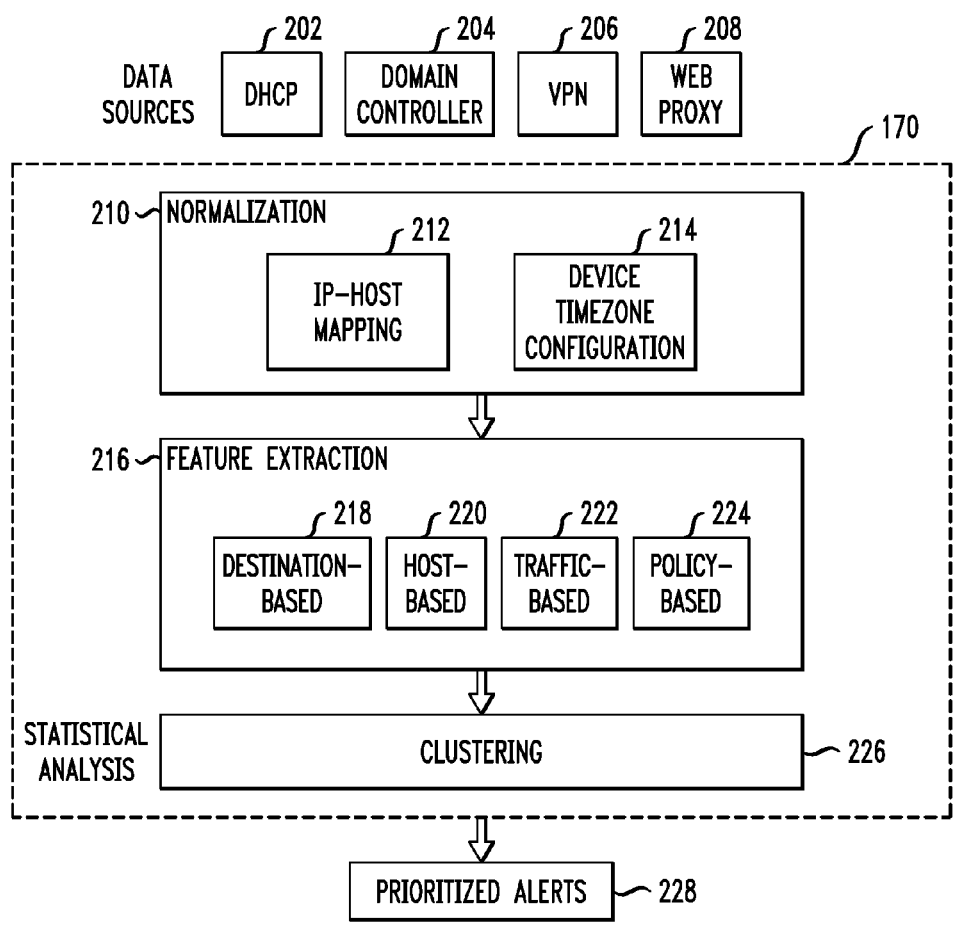
FIG. 2 is a block diagram illustrating example system components, according to an embodiment of the invention.

An exemplary behavior detection system (such as system 170 in FIG. 1) is described in additional detail below in connection with FIG. 2. FIG. 2 is a block diagram illustrating example system components, according to an embodiment of the invention. By way of illustration, FIG. 2 depicts data sources such as dynamic host configuration protocol (DHCP) servers 202, domain controllers 204, virtual private networks (VPNs) 206 and web proxies 208. Such data sources, as detailed herein, are processed and analyzed by the behavior detection system 170 to ultimately generate prioritized alerts 228.

As also depicted in FIG. 2, the behavior detection system 170 includes three layers: (1) a normalization layer 210 that includes functionality to parse, filter, and normalize log data using network-specific configuration information; (2) a feature extraction layer 216 that includes feature generators that process normalized log data to produce a set of distinct features for each host per day; and (3) a statistical analysis layer that includes a detector component 226 that performs clustering over features to identify outlying, suspicious periods of host activity, which the system 170 reports as incidents.

As will be further described in additional detail below, the normalization layer 210 can include an internet protocol (IP)-to-host mapping component 212 and a device time zone configuration component 214. Similarly, the feature extraction layer 216 can include a destination-based feature generator 218, a host-based feature generator 220, a traffic-based feature generator 222 and a policy-based feature generator 224. Further, as noted herein, the statistical analysis layer includes a clustering component 226.

As depicted in FIG. 2, at least one embodiment of the invention includes utilizing a wide range of logs generated by various network devices, including, as noted, web proxies 208 that log every outbound connection, DHCP servers 202 that log dynamic IP address assignments, VPN servers 206 that log remote connections to the enterprise network, and domain controllers 204 (for example, Windows® domain controllers) that log authentication attempts within the corporate domain. Additionally, data sources can include, for example, antivirus software that logs the results of malware scans on end hosts. Logs such as detailed above can be stored in a commercial security information and event management (SIEM) system.

Devices such as the above-identified monitor and log the activities of enterprise hosts transparently, with the exception of the web proxy. For every external destination, the web proxy consults a list of domain reputation scores and site categories maintained by the product vendor, and automatically blocks the connection if the destination has a low reputation or is in a prohibited category. However, if the destination is not identified as having a low reputation or being in a prohibited category, the proxy can display to the user a warning page describing the potential dangers of connecting to an unknown destination. The user must then, in many instances, explicitly click on a link to acknowledge agreement to the enterprise's network policies, or not visit the site.

One or more embodiments of the invention include making use of web proxy logs because the majority of network activity in enterprises is commonly conducted over hypertext transfer protocol (HTTP) or hypertext transfer protocol secure (HTTPS). Additionally, such logs include all fields in HTTP headers, making the logs a particularly useful resource for understanding users' browsing behavior, detecting suspicious connections, and forensic analysis. By way of example, Table 1 lists a subset of the fields included in web proxy logs.

TABLE 1

Example fields in web proxy logs

| | |
|---|---|
| IP Header | Source/destination IP and port, protocol |
| Transport Header | Destination domain, uniform resource locator (URL), HTTP status code, web referrer, domain reputation, domain category, user-agent string |
| Connection Attribute | Sent and received bytes, network policy |

In a given enterprise network, logs generated by different security products can contain huge amounts of information about user and host behaviors. However, such logs are also often noisy; that is, the logs can include non-standardized timestamps, different identifiers (for example, web proxy logs always include the IP address of the host, but VPN logs include the host name) and/or can be truncated or arrive out of order. As noted above, the potentially massive number of events observed on a real-life enterprise network and logged inside a SIEM system poses a challenge in log analysis and detection of security incidents.

Additionally, a challenge also exists in identifying meaningful security incidents in the face of a significant semantic gap between the logs collected by a SIEM system and the information that security analysts require to identify suspicious host behavior. For example, associating IP addresses with specific hosts requires correlation across different logs, which can be challenging when IP addresses are dynamically assigned in the network. The situation can be further complicated by the fact that the logging devices may be located in different time zones (as is typical for the infrastructure of a global organization).

Accordingly, at least one embodiment of the invention incorporates functionalities to address such challenges. For example, as depicted in FIG. 2, the detection system 170 includes a normalization layer 210, wherein the timestamps of all log entries are normalized (for example, normalized to Coordinated Universal Time (UTC)) via device time zone configuration component 214. Additionally, the normalization layer 210 determines statically and dynamically assigned IP addresses of hosts, and constructs bindings between hosts and IP addresses via IP-host mapping component 212, thus attributing every logged event to a specific host.

Further, as additionally detailed below, at least one embodiment of the invention includes extracting enterprise-specific features for individual hosts, and clustering hosts with similar suspicious behaviors. The resulting outlying clusters are presented as incidents and/or alerts (such as alerts 228 in FIG. 2) to be examined by security analysts.

Referring back to the normalization layer 210, the device time zone configuration component 214 leverages the common use by enterprises of a central SIEM system for log management that tags each log entry with its own timestamp $t_{siem}$, recording the time at which the log was received by the SIEM. For each device that sends logs to the SIEM system, at least one embodiment of the invention includes computing a set of time difference values $\Delta_i = t_{siem,i} - t_{device,i}$ (that can be, for example, rounded off to the nearest 30 minutes) from each log entry i generated over a time period (for example, one month). Additionally, such an embodiment includes determining the timestamp correction value $\Delta_{correction}$ for the device by setting the correction value to the value $\Delta_i$ that accounts for the majority of differences. Applying this correction value to each device timestamp produces a normalized timestamp value, $t_{normalized,i} = t_{device,i} + \Delta_{correction}$. By way merely of example, $t_{normalized,i}$ can be configured to correspond to UTC. Additional description of an exemplary normalization technique can be found, for example, in U.S. patent application Ser. No. 13/731,654, entitled "Time Sanitization of Network Logs from a Geographically Distributed Computer System," filed on Dec. 31, 2012, and incorporated by reference herein in its entirety. Accordingly, at least one embodiment of the invention includes applying the above normalization technique to each device on the network that produces log data, normalizing all log timestamps (for example, to UTC).

Additionally, as noted herein, in an enterprise setting, end hosts are commonly assigned IP addresses dynamically for a short time period when the hosts connect to the network, for example, through the DHCP. This presents challenges in associating the IP addresses reported in logs with unique host machines during analysis because an IP address can be assigned to different hosts after the event has been logged.

Additionally, as depicted in FIG. 2, the detection system 170 includes an IP-host mapping component 212 as a part of the normalization layer 210. The IP-host mapping component 212 analyzes DHCP server logs collected in the SIEM system and constructs a database of IP-to-host mappings (also referred to herein as bindings) over time. Each binding is represented as a tuple {IP address, hostname, media access control (MAC) address, start-time, end-time} mapping an IP address to a host in a specific time interval. The algorithm implemented to carry out the mapping can be run at intervals (for example, daily) to update existing bindings as new DHCP logs become available. Given the resulting database of bindings, at least one embodiment of the invention can include identifying the host corresponding to a given IP address with reference to a normalized timestamp.

Additional description of an exemplary mapping technique can be found, for example, in U.S. patent application Ser. No. 13/731,643, entitled "Framework for Mapping Network Addresses to Hosts in an Enterprise Network," filed Dec. 31, 2012, and incorporated by reference herein in its entirety.

An IP-to-host look-up on a bindings database may potentially fail because an IP address is assigned statically to a specific host, as opposed to being dynamically leased. Maintaining a list of static IP address assignments, however, is difficult in a large enterprise network, and administrator-created lists are often non-existent or outdated. Accordingly, at least one embodiment of the invention includes automatically identifying hosts with static IP addresses.

In a bootstrap phase, at least one embodiment of the invention includes retrieving all IP addresses found in all collected logs to create a pool of IP addresses active in the enterprise, denoted by set A. Additionally, IP addresses are retrieved from logs that are known to only contain hosts with dynamic IP addresses, such as DHCP and VPN logs, to create a pool of known dynamic IP addresses, denoted by set D. The set difference S=A–D, which contains potentially static IP addresses, can then be computed, and a reverse domain name system (DNS) lookup for every address in S can be performed. The results can additionally be saved to complete the bootstrap phase.

Periodically (for example, once a day), as new logs become available, at least one embodiment of the invention includes repeating the bootstrapping phase to gather new IP addresses and update sets A, D and S. Further, with each iteration, at least one embodiment of the invention can include resolving IP addresses in S to the respective host names and comparing the names to the previously stored values. If the host names changed between two iterations, it can be concluded that the given IP address is not statically assigned, and that IP address is removed from the set S. In this way, the pool of potentially static IP addresses can be refined with each iteration. If a corresponding binding for an IP-to-host lookup is not found, but instead, the given address in S is found, that IP address is treated as a static host and the host name found in S is utilized.

At least one embodiment of the invention includes monitoring the behavior of dedicated hosts, which are machines utilized by a single user. Because a list of dedicated hosts is difficult to maintain in large enterprises due to constantly changing network configurations, at least one embodiment of the invention includes inferring a list of dedicated hosts from the data available in the SEEM system.

Such an embodiment can include making use of authentication logs generated by domain controllers (such as domain controllers 204 as depicted in FIG. 2). For each user in a given enterprise, a history is kept of hosts onto which the user had authenticated (that is, logged-on), the number of authentications, and the authentication timestamps. This information is collected over a period of time (for example, multiple months) to build a history of user activity. At the end of the collection period, a host can be considered "dedicated" if a single user is responsible for a large majority (for example, 95%) of the authentication events on that host.

As also noted above, at least one embodiment of the invention includes a feature extraction layer 216 as part of the behavior detection system 170. Accordingly, such an embodiment can include extracting features from logs to characterize outbound communications from the enterprise. Feature selection can be guided, for example, by observation of known malware behaviors and policy violations within a given enterprise, as well as by properties of the environment in which the behavior detection system 170 operates (for example, the presence of perimeter defenses in the form of strict firewall policies, the business orientation of (most) users' activities, and the (relatively) homogeneous software configurations of enterprise-managed hosts).

For each dedicated host in the enterprise, a feature vector can be generated at a given time interval (for example, daily) that includes multiple features. By way of example, Table 2 identifies 15 exemplary features incorporated in one or more embodiments of the invention. As noted in Table 2 (and also depicted similarly in FIG. 2), features can be grouped into categories. Feature categories can include, for example, features based on new destinations contacted by the host, features related to the host's software configuration, features related to the company policy, features based on traffic volume and timing, and features related to external destinations that are raw IP addresses. Such feature categories are additionally described below.

TABLE 2

Features.

| Feature Type | # | Description |
| --- | --- | --- |
| Destination-based | 1 | New destinations |
|  | 2 | New destinations without whitelisted referrer |
| Host-based | 3 | New user-agent strings |
|  | 4 | Blocked domains |
|  | 5 | Blocked connections |
| Policy-based | 6 | Challenged domains |
|  | 7 | Challenged connections |
|  | 8 | Consented domains |
|  | 9 | Consented connections |
|  | 10 | Connection spikes |
| Traffic-based | 11 | Domain spikes |
|  | 12 | Connection bursts |
|  | 13 | Domain bursts |
| Raw IP destinations | 14 | Unpopular raw IP destinations |
|  | 15 | Fraction of unpopular raw IP destinations |

With respect to destination-based features, hosts are identified that communicate with new (or obscure) external destinations that are never (or rarely) contacted from within the given enterprise. Assuming that popular websites are better administered and less likely to be compromised, connections to uncommon destinations may be indicative of suspicious behavior (for example, communication with command-and-control servers).

Accordingly, one destination-based feature includes the number of new external destinations contacted by each host in a given time interval (for example, per day). At least one embodiment of the invention includes building a history of external destinations contacted by internal hosts over time. After an initial boot-strapping period (for example, one month), a destination can be considered to be new on a particular day if that destination has never been contacted by hosts in the enterprise within the observation period (and as such, is not part of the history). The history can be updated periodically (for example, daily) to include new destinations that are contacted.

Additionally, to make one or more embodiments of the invention scalable, a number of data reduction techniques are employed, including filtering, custom whitelisting and domain folding. Accordingly, at least one embodiment of the invention includes filtering popular and/or commonly visited destinations by creating a custom whitelist, where popularity is defined over hosts in the enterprise. The whitelist includes external destinations (both domains and IP subnets) whose number of interacting internal hosts over time (for example, a training period of one week) exceeds a given threshold.

In addition to custom whitelisting, at least one embodiment of the invention includes folding destinations to a second-level sub-domain so as to filter services employing random strings as sub-domains. By way of example, the DNS has a hierarchical (tree) structure: each node in the tree is a domain, the root domain is referred to as the domain, and a child of the domain is referred to as a sub-domain (for example "google.com" is a sub-domain of ".com"). Nodes at the first level of the tree are referred to as top-level domains. When folding, at least one embodiment of the invention includes parsing the domain name in reverse order until a second-level sub-domain is obtained. For example, domain "news.bbc.co.uk" is folded to "bbc.co.uk" because both "co" and "uk" are top-level domains.

Also, connections associated with bookmarks can be ignored as well. Further, at least one embodiment of the invention includes opting not to resolve raw IPs (as most legitimate sites are referred to by a domain name), and considering raw IPs that are not on the whitelist as "new."

Another destination-based feature includes an extension of the above-described feature, but further counts the number of new destinations contacted by a host without a whitelisted HTTP referrer. Users are commonly directed to new sites by search engines, news sites, or advertisements. In such cases, it can be expected that the HTTP referrer is listed in the above-noted custom whitelist. Hosts that visit new sites without being referred by a reputable source (or with no referrer at all) can be considered suspicious.

As also detailed herein (and as depicted in FIG. 2), at least one embodiment of the invention includes host-based features. Hosts in an enterprise are commonly more homogeneous in their software configurations than, for example, those in academic networks. As such, scenarios of interest can include cases wherein hosts install new (and potentially unauthorized) software.

Lacking visibility onto the host machine, and having access only to logs collected from network devices, at least one embodiment of the invention includes inferring software configurations on a host from the user-agent (UA) strings included in HTTP request headers. A UA string includes the name of the application making the request, the application version, capabilities, and the operating environment. Accordingly, the host-based feature of one or more embodiments of the invention includes the number of new UA strings from the host.

Such an embodiments further includes building a history of UA strings per host over a period of time (for example, a month), during which every UA string observed from the host is stored. At the end of this time period, a UA string is considered new if the string is sufficiently distinct from all UA strings in that host's history. Edit distance (also referred to as Levenshtein distance) can be used to compare UA strings, measuring the number of character insertions, deletions, and substitutions required to change one string into another string. This facilitates an accommodation of new UA strings that result from software updates, wherein only one or more sub-strings (for example, the version number) change.

As additionally detailed herein (and as depicted in FIG. 2), at least one embodiment of the invention includes policy-based features. Enterprise environments commonly include the enforcement of network policies on outbound connections. As described herein, a connection to an external destination can be blocked if the destination has a dubious reputation or is categorized as prohibited for employees. Blocked domains (and connections) can thus represent a coarse indicator of host misbehavior.

Upon visiting an unknown destination (that is, a destination that has not yet been categorized or rated), the user is commonly required to explicitly agree to adhere to the company's policies before being allowed to proceed. The domains (and connections) that require this acknowledgment are referred to herein as challenged, and those to which the user has agreed as consented.

In at least one embodiment of the invention, policy-based features include multiple types of communications, as described herein. For a host, the number of domains (and connections) contacted by the host that are blocked, challenged, or consented are counted.

Also, as detailed herein (and as depicted in FIG. 2), at least one embodiment of the invention includes traffic-based features. Sudden spikes in a host's traffic volume can be caused by malware (for example, scanning, or bot activities in response to bot-master commands) or automated processes. In accordance with at least one embodiment of the invention, traffic-based features attempt to capture such activities by leveraging the amount of time that a host is generating abnormally high volumes of traffic.

More specifically, at least one embodiment of the invention includes defining a connection (or domain) spike as a window (for example, a one-minute window) during which the host generates more connections (or contacts more domains) than a given threshold. A connection (or domain) burst is additionally defined as a time interval in which every increment within the interval (for example, every minute within that interval) represents a connection (or domain) spike.

To identify an appropriate threshold for "high" traffic volume, at least one embodiment of the invention includes examining all dedicated hosts over a given interval (for example, one week), and counting the number of connections (and domains) each host generates (or contacts) (for example, generates on a per minute basis). Additionally, by examining the connection and domain counts for every host over a given interval (for example, one-week), a distribution of normal behavior can be determined. At least one embodiment of the invention also includes setting a corresponding threshold at some percentile of the distribution (for example, the 90th percentile) and defining a spike as an interval in which the number of connections and/or domains exceeds the threshold.

As such, for each dedicated host, the respective traffic-based features can include: 1) the number of connections spikes, 2) the number of domain spikes, 3) the duration of the longest connection burst, and 4) the duration of the longest domain burst.

As also detailed herein (and as depicted in FIG. 2), at least one embodiment of the invention includes features pertaining to unpopular IP destinations, wherein popularity is defined (as noted herein) with respect to hosts at the given enterprise. With such features, the number of destinations contacted by a host that are both unpopular (for example, not on a custom whitelist, as described above) and are IP addresses are counted. Connections to unpopular Ws can indicate suspicious activity, as legitimate services commonly can be reached by respective domain names. Also, the fraction of unpopular destinations contacted by a host that are IP addresses can also be included. While occasional communication with IP destinations is normal (for example, to IP ranges owned by content distribution networks (CDNs)), such behavior can represent suspicious behavior when frequent.

Further, as depicted via component 226 of behavior detection system 170 in FIG. 2, at least one embodiment of the invention includes clustering functionality. As noted herein, because employees in an enterprise commonly perform specific job functions on the enterprise network (and there are commonly multiple employees in most departments of the enterprise), such embodiments of the invention include observing groups of hosts (belonging to users with similar roles) exhibiting similar behaviors, while identifying misbehaving hosts with unique behavioral patterns as outliers.

By way of example, given the 15 features detailed in Table 2 above, each internal host can be represented as a 15-dimensional vector, $v=(v[1], v[2], \ldots, v[15])$. However, the features may be related or dependent upon one another; for example, a domain spike also triggers a connection spike. To remove such dependencies between the features and reduce the dimensionality of the vectors, at least one embodiment of the invention includes applying Principal Component Analysis (PCA), which enables data reduction by projecting the original vectors onto a new set of axes (that is, the principal components). Each principal component is chosen to capture as much of the variance (and thus the original information) in the data as possible. Depending on how much variance is to be captured from the original data, the top m principal components are selected, permitting projection of the original vectors down to dimensionality m.

At least one embodiment of the invention includes applying a clustering algorithm to the projected vectors after PCA. In an example embodiment, the algorithm is an adaptation of the K-means clustering algorithm, but does not require the number of clusters to be specified in advance. Such an algorithm can be carried out as follows:

1. Randomly select a vector as the first cluster hub, and assign all vectors to this cluster.
2. Select the vector farthest away from its hub as a new hub, and reassign every vector to the cluster with the closest hub.
3. Repeat step 2 until no vector is farther away from its hub than half of the average hub-to-hub distance.

Additionally, vectors are compared via L1 distance; that is, for vectors $v_1$ and $v_2$, their distance is $\Sigma_{i=1}^{m}|v_1[i]-v_2[i]|$.

The clustering algorithm can be applied at a given interval (for example, daily) on the feature vectors for all active, dedicated hosts in the enterprise.

As also detailed herein and depicted in FIG. 2, at least one embodiment of the invention includes generating incidents (also identified as prioritized alerts 228 in FIG. 2) for the given outlying hosts, and reporting the incidents to a security analyst. The incidents (or alerts) can include contextual information pertaining to the hosts identified as outliers. By way of example, an incident can include the values of all of the above-noted 15 features for the host, the cluster to which the host belongs, the feature vectors for other hosts in the cluster, the distinctive features for the cluster (that is, the features with maximum normalized value), the new destinations contacted by the host, the top blocked, challenged and consented domain contacted by the host, the unpopular raw IP destinations contacted by the host, etc. Additionally, a graphical representation of the incidents generated over a given period of time (for example, in a particular day) can be displayed to an analyst.

Note also that the clustering algorithm, as detailed above, forms clusters by iteratively identifying the node that is farthest away from its cluster hub, and, accordingly, the clusters include an inherent ordering. In cases wherein the algorithm is biased by extreme outliers (for example, forming only two clusters: one cluster with a single node, and a second cluster with all other nodes), PCA can be applied and the clustering algorithm can be re-applied to the largest cluster. This process can further be iterated until a given number (for example, at least 50) outlying hosts are identified.

Figure 3:
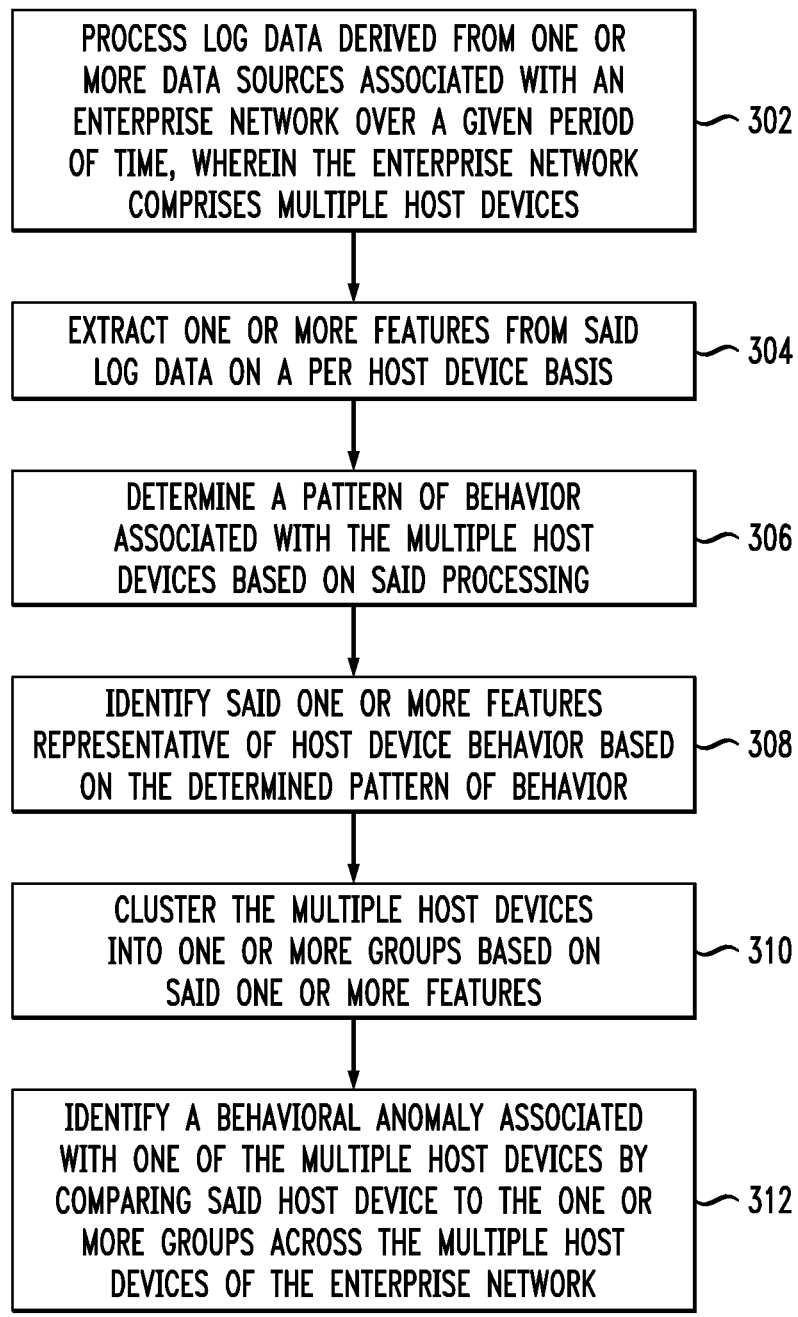
FIG. 3 is a flow diagram illustrating techniques according to an embodiment of the invention.

FIG. 3 is a flow diagram illustrating techniques according to an embodiment of the present invention. Step 302 includes processing log data derived from one or more data sources associated with an enterprise network over a given period of time, wherein the enterprise network comprises multiple host devices. The one or more data sources can include, for example, a dynamic host configuration protocol server, a domain controller, a virtual private network server, and/or a web proxy.

Processing can include normalizing the log data. Normalizing can include normalizing a timestamp associated with each item of said log data into a common time zone, and normalizing can also include establishing a mapping between each internet protocol (IP) address associated with said log data and a unique identifier for each of said multiple host devices.

Step 304 includes extracting one or more features from said log data on a per host device basis. Additionally, step 304 includes the actions taught in step 306 and step 308. Step 306 includes determining a pattern of behavior associated with the multiple host devices based on said processing. Step 308 includes identifying said one or more features representative of host device behavior based on the determined pattern of behavior. Additionally, as described herein, extracting can include extracting the one or more features from the log data based on network behavior of said multiple host devices within the enterprise network.

The features can include, for example, a feature based on one or more external destinations contacted by a given host device, a feature based on software configuration of a given host device, a feature related to the volume of traffic generated by a given host device, and/or a feature related to one or more filtering policies imposed by a given web proxy associated with the enterprise network. By way of example, extracting a feature based on one or more external destinations can include filtering one or more destinations by creating a whitelist, wherein the whitelist includes one or more destinations whose number of interacting devices among the multiple host devices over a given time period exceeds a given threshold. Also, in at least one embodiment of the invention, the above-noted step of extracting one or more features from said log data additionally includes specifying a value for each of said one or more features.

Step 310 includes clustering the multiple host devices into one or more groups based on said one or more features. Step 312 includes identifying a behavioral anomaly associated with one of the multiple host devices by comparing said host device to the one or more groups across the multiple host devices of the enterprise network. The techniques depicted in FIG. 3 can also include determining a value for each of said one or more features among said log data in the one or more groups.

Figure 4:
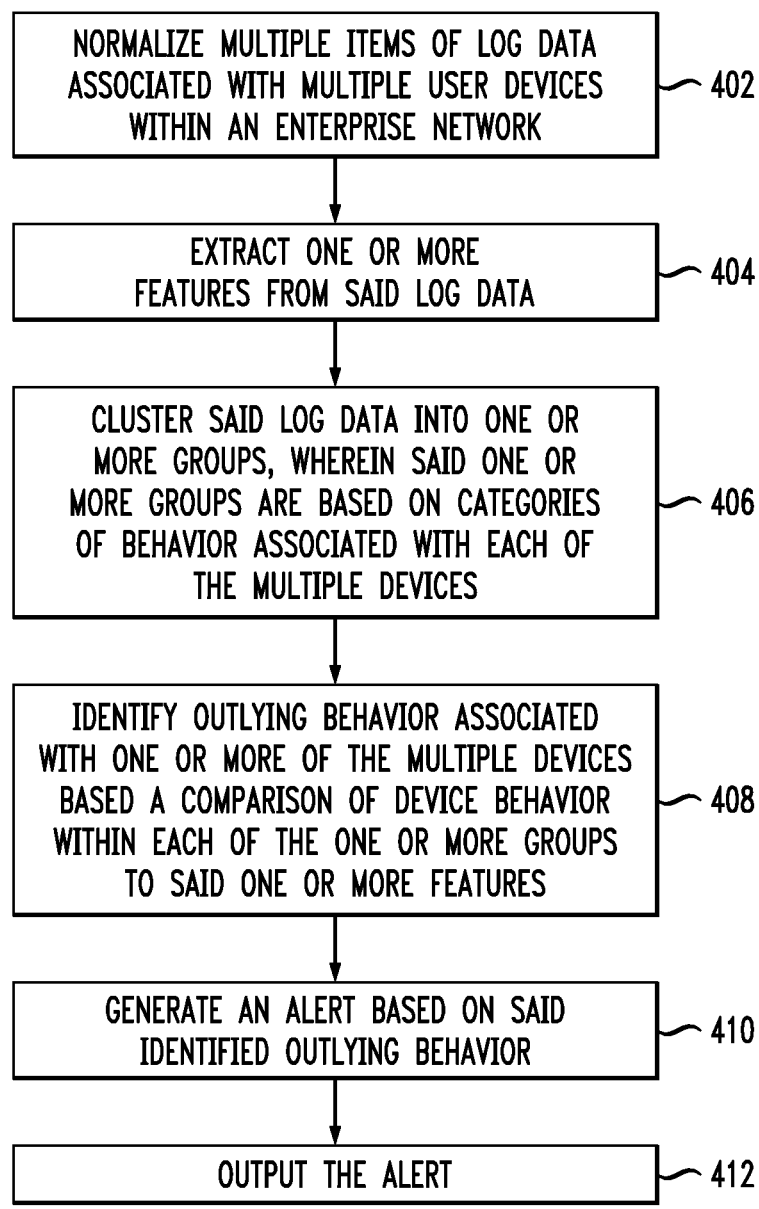
FIG. 4 is a flow diagram illustrating techniques according to an embodiment of the invention.

FIG. 4 is a flow diagram illustrating techniques according to an embodiment of the present invention. Step 402 includes normalizing multiple items of log data associated with multiple user devices within an enterprise network. Step 404 includes extracting one or more features from said log data. Step 406 includes clustering said log data into one or more groups, wherein said one or more groups are based on categories of behavior associated with each of the multiple devices. Step 408 includes identifying outlying behavior associated with one or more of the multiple devices based a comparison of device behavior within each of the one or more groups to said one or more features. Step 410 includes generating an alert based on said identified outlying behavior. Step 412 includes outputting the alert.

Figure 5:
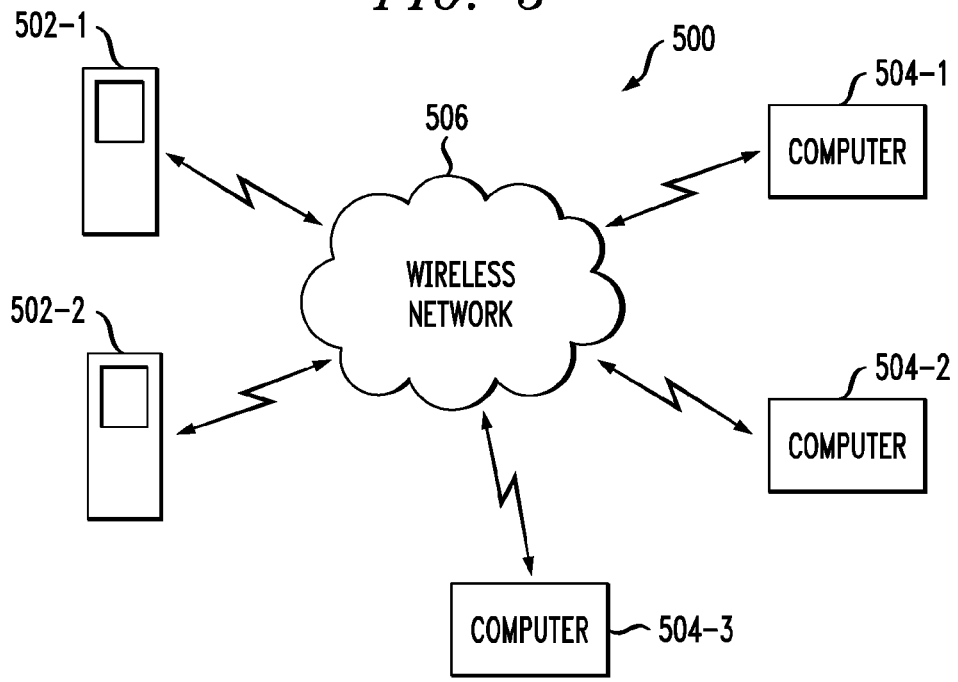
FIG. 5 shows an exemplary embodiment of a communication system that may incorporate the functionality of the type illustrated in at least one embodiment of the invention.

Behavioral detection techniques of the type described herein may be implemented in a wide variety of different applications and scenarios. One exemplary scenario that may incorporate such techniques will now be described with reference to FIG. 5. Accordingly, FIG. 5 depicts a communication system 500 comprising a plurality of mobile telephones 502-1 and 502-2 and computers 504-1, 504-2 and 504-3, configured to communicate with one another over a network 506. For instances, such mobile telephones (for example, smart phones) and computers can be devices associated with employees and/or users within an enterprise network. It should be also noted and appreciated that despite the limited number of devices illustrated in FIG. 5, the techniques described herein are scalable and, accordingly, can also be incorporated and/or implemented in connection with networks of much larger size.

Any two or more of the devices 502 and 504 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/ acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
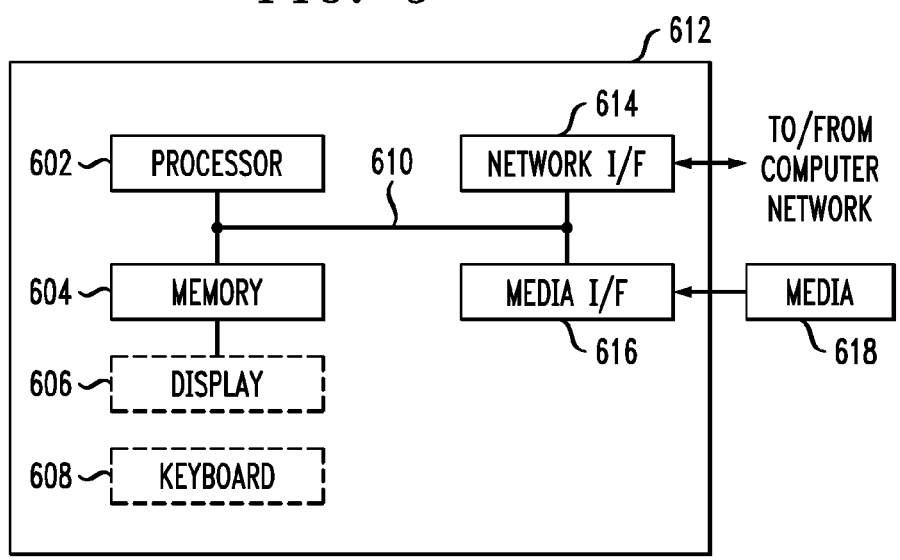
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from behavioral detection of suspicious host activities. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    processing log data derived from data sources associated with an enterprise network over a given period of time, wherein the enterprise network comprises multiple host devices, and wherein the data sources comprise at least a domain controller, a virtual private network server, a web proxy, and a dynamic host configuration protocol server;
    creating a whitelist that is customized to the enterprise network, wherein said whitelist comprises multiple external destinations determined to have been contacted by a given number of the multiple host devices over a temporal training period, wherein the given number of the host devices is in excess of a predetermined threshold number of host devices;
    filtering the identified external destinations of the whitelist from the processed log data;
    extracting one or more network traffic features from said filtered log data on a per host device basis, wherein said extracting comprises:
        determining a network traffic pattern associated with the multiple host devices based on said processing; and
        identifying said one or more network traffic features representative of a host device based on the determined network traffic pattern;
    clustering the multiple host devices into one or more groups based on said one or more network traffic features; and
    identifying an anomaly associated with one of the multiple host devices by comparing said host device to the one or more groups across the multiple host devices of the enterprise network;
    wherein said processing, said creating, said filtering, said extracting, said clustering, and said identifying are carried out by at least one computing device.

2. The method of claim 1, wherein said extracting comprises extracting said one or more network traffic features from said filtered log data based on network traffic of said multiple host devices within the enterprise network.

3. The method of claim 1, wherein said processing comprises normalizing said log data.

4. The method of claim 3, wherein said normalizing comprises normalizing a timestamp associated with each item of said log data into a common time zone.

5. The method of claim 3, wherein said normalizing comprises establishing a mapping between each internet protocol (IP) address associated with said log data and a unique identifier for each of said multiple host devices.

6. The method of claim 1, wherein said one or more network traffic features comprise a feature based on one or more external destinations contacted by a given host device.

7. The method of claim 1, wherein said one or more network traffic features comprise a feature based on software configuration of a given host device.

8. The method of claim 1, wherein said one or more network traffic features comprise a feature related to volume of traffic generated by a given host device.

9. The method of claim 1, wherein said one or more network traffic features comprise a feature related to one or more filtering policies imposed by a given web proxy associated with the enterprise network.

10. The method of claim 1, wherein said extracting one or more network traffic features from said filtered log data further comprises specifying a value for each of said one or more network traffic features.

11. The method of claim 1, further comprising:
    determining a value for each of said one or more network traffic features among said filtered log data in the one or more groups.

12. An article of manufacture comprising a non-transitory processor-readable storage medium having processor-readable instructions tangibly embodied thereon which, when implemented, cause a processor to carry out the steps of the method of claim 1.

13. An apparatus comprising:
a memory; and
at least one processor coupled to the memory and configured to:
process log data derived from data sources associated with an enterprise network over a given period of time, wherein the enterprise network comprises multiple host devices, and wherein the data sources comprise at least a domain controller, a virtual private network server, a web proxy, and a dynamic host configuration protocol server;
create a whitelist that is customized to the enterprise network, wherein said whitelist comprises multiple external destinations determined to have been contacted by a given number of the multiple host devices over a temporal training period, wherein the given number of the host devices is in excess of a predetermined threshold number of host devices;
filter the identified external destinations of the whitelist from the processed log data;
extract one or more network traffic features from said filtered log data on a per host device basis, wherein said extracting comprises:
determining a network traffic pattern associated with the multiple host devices based on said processing; and
identifying said one or more network traffic features representative of a host device based on the determined network traffic pattern;
cluster the multiple host devices into one or more groups based on said one or more network traffic features; and
identify an anomaly associated with one of the multiple host devices by comparing said host device to the one or more groups across the multiple host devices of the enterprise network.

14. A method comprising:
normalizing multiple items of log data (i) associated with multiple user devices within an enterprise network and (ii) derived from data sources associated with the enterprise network, wherein the data sources comprise at least a domain controller, a virtual private network server, a web proxy, and a dynamic host configuration protocol server;
creating a whitelist that is customized to the enterprise network, wherein said whitelist comprises multiple external destinations determined to have been contacted by a given number of the multiple host devices over a temporal training period, wherein the given number of the host devices is in excess of a predetermined threshold number of host devices;
filtering the identified external destinations of the whitelist from the processed log data;
extracting one or more network traffic features from said filtered log data;
clustering said filtered log data into one or more groups, wherein said one or more groups are based on categories associated with each of the multiple devices;
identifying outlying network traffic associated with one or more of the multiple devices based a comparison of device network traffic within each of the one or more groups to said one or more network traffic features;
generating an alert based on said identified outlying network traffic; and
outputting the alert.

15. The method of claim 14, wherein said normalizing comprises normalizing a timestamp associated with each item of said log data into a common time zone.

16. The method of claim 14, wherein said normalizing comprises establishing a mapping between each internet protocol (IP) address associated with said log data and a unique identifier for each of said multiple host devices.

17. The method of claim 14, wherein said one or more network traffic features comprise a feature based on one or more external destinations contacted by a given host device.

18. The method of claim 14, further comprising:
determining a value for each of said one or more network traffic features among said filtered log data in the one or more groups.

19. The apparatus of claim 13, wherein said processing comprises normalizing said log data.

20. The apparatus of claim 19, wherein said normalizing comprises normalizing a timestamp associated with each item of said log data into a common time zone.

* * * * *

UNITED STATES PATENT AND TRADEMARK OFFICE
CERTIFICATE OF CORRECTION

PATENT NO. : 9,516,039 B1  Page 1 of 1
APPLICATION NO. : 14/139047
DATED : December 6, 2016
INVENTOR(S) : Yen et al.

It is certified that error appears in the above-identified patent and that said Letters Patent is hereby corrected as shown below:

In the Drawings

In Fig 4, Sheet 3, step 408, replace "based a comparision of" with --based on a comparison of--.

In the Specification

Column 1, Line 16, replace "and more particularly to IT" with --and more particularly, to IT--.

Column 4, Line 10, replace "the above identified monitor and log the" with --the above identified, monitor and log the--.

Column 5, Line 40, replace "Dec. 31, 2012, and" with --Dec. 31, 2012, (now U.S. Patent No. 9,430,501), and--.

Column 6, Line 5, replace "2012, and incorporated" with --2012, (now U.S. Patent No. 9,124,585), and incorporated--.

Column 6, Line 47, replace "in the SEEM system." with --in the SIEM system.--.

Column 8, Line 49, replace "Such an embodiments" with --Such an embodiment--.

Column 9, Line 51, replace "the number of connections" with --the number of connection--.

Column 12, Line 4, replace "the multiple devices based a" with --the multiple devices based on a--.

Signed and Sealed this
Thirtieth Day of May, 2017

Michelle K. Lee
*Director of the United States Patent and Trademark Office*